Figure 1:
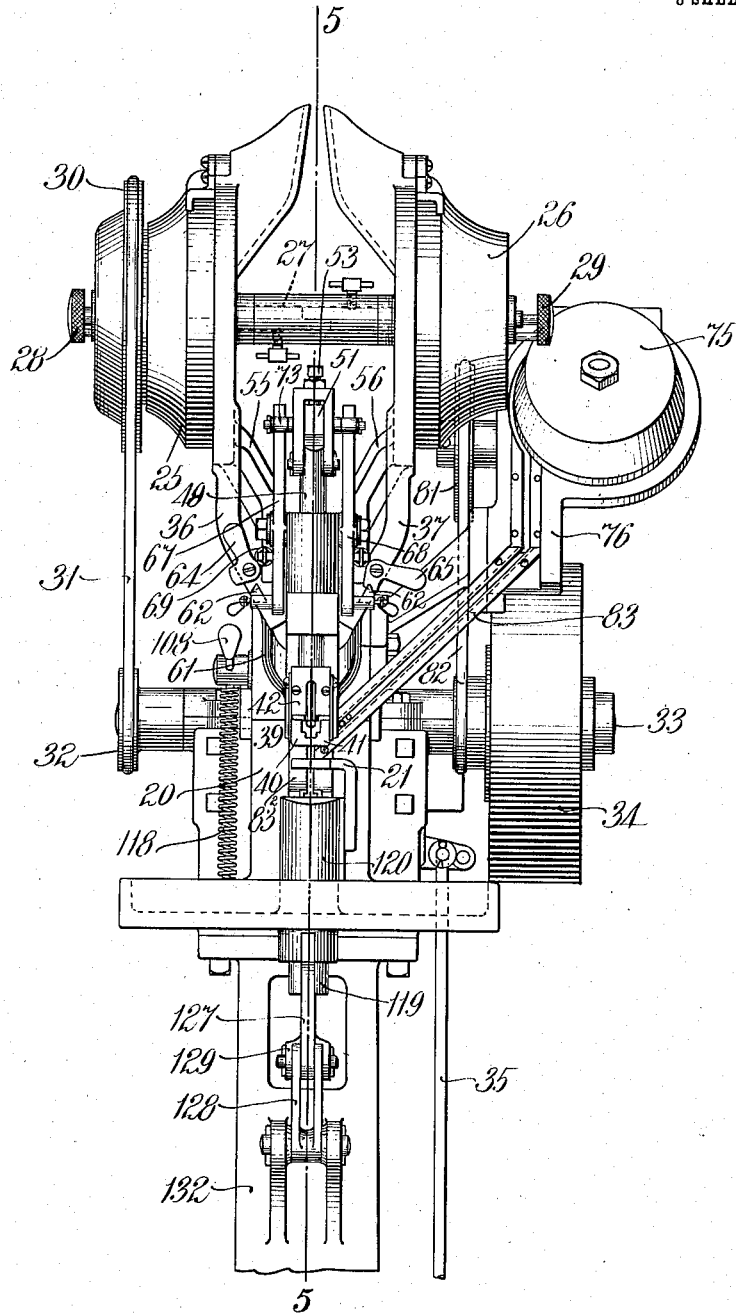

A. R. HAVENER.
MACHINE FOR ATTACHING BUTTONS, &c., TO FABRIC.
APPLICATION FILED NOV. 7, 1908.

937,150.

Patented Oct. 19, 1909.
8 SHEETS—SHEET 2.

Witnesses:
Sydney E. Taft.
Franklin E. Low.

Inventor:
Arthur R. Havener,
by his attorney,
Charles T. Gooding.

A. R. HAVENER.
MACHINE FOR ATTACHING BUTTONS, &c., TO FABRIC.
APPLICATION FILED NOV. 7, 1908.

937,150.

Patented Oct. 19, 1909.
8 SHEETS—SHEET 4.

Witnesses:
Sydney E. Taft.
Franklin E. Low.

Inventor:
Arthur R. Havener,
By his attorney,
Charles J. Gooding.

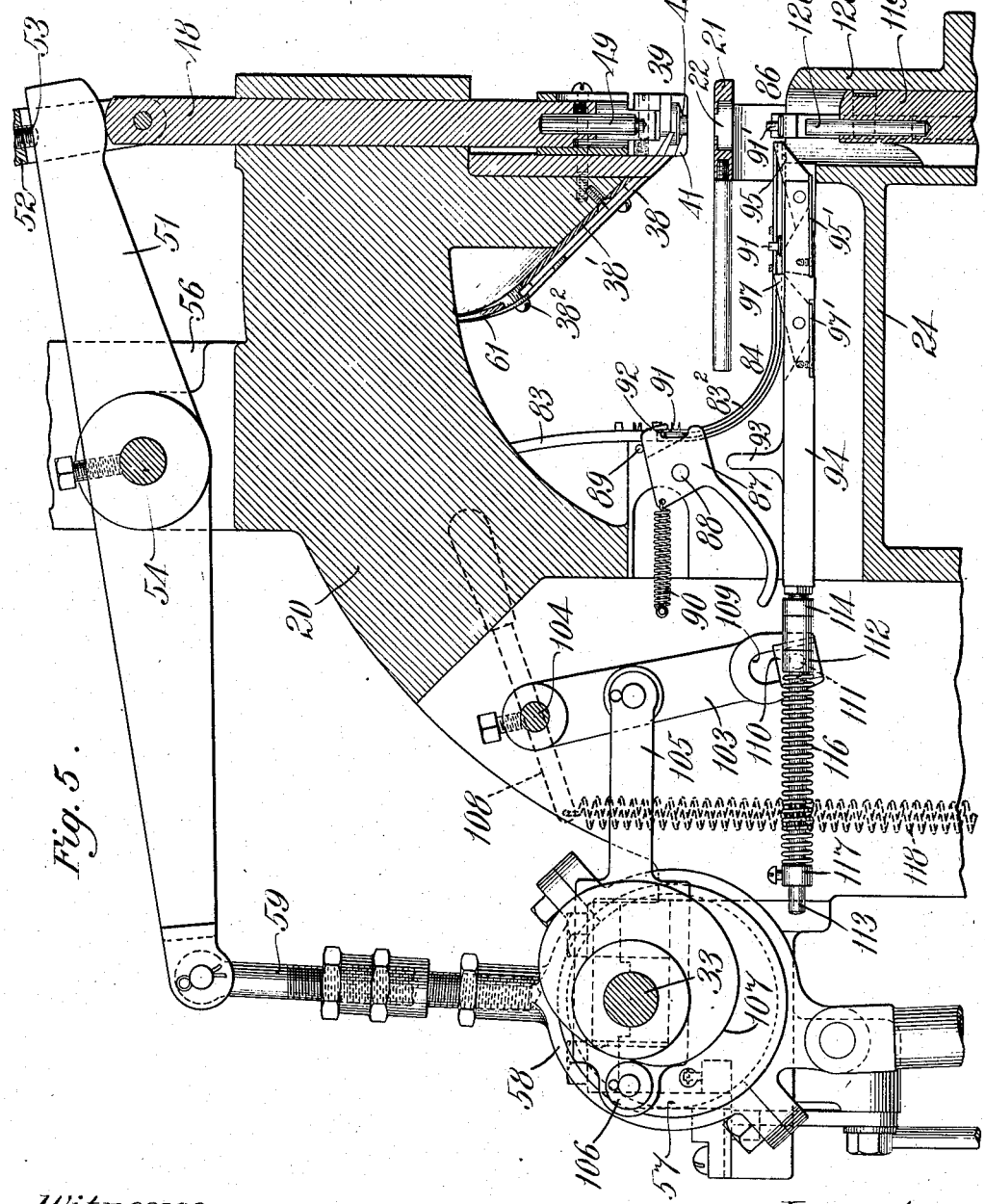

A. R. HAVENER.
MACHINE FOR ATTACHING BUTTONS, &c., TO FABRIC.
APPLICATION FILED NOV. 7, 1908.
937,150.
Patented Oct. 19, 1909.
8 SHEETS—SHEET 6.
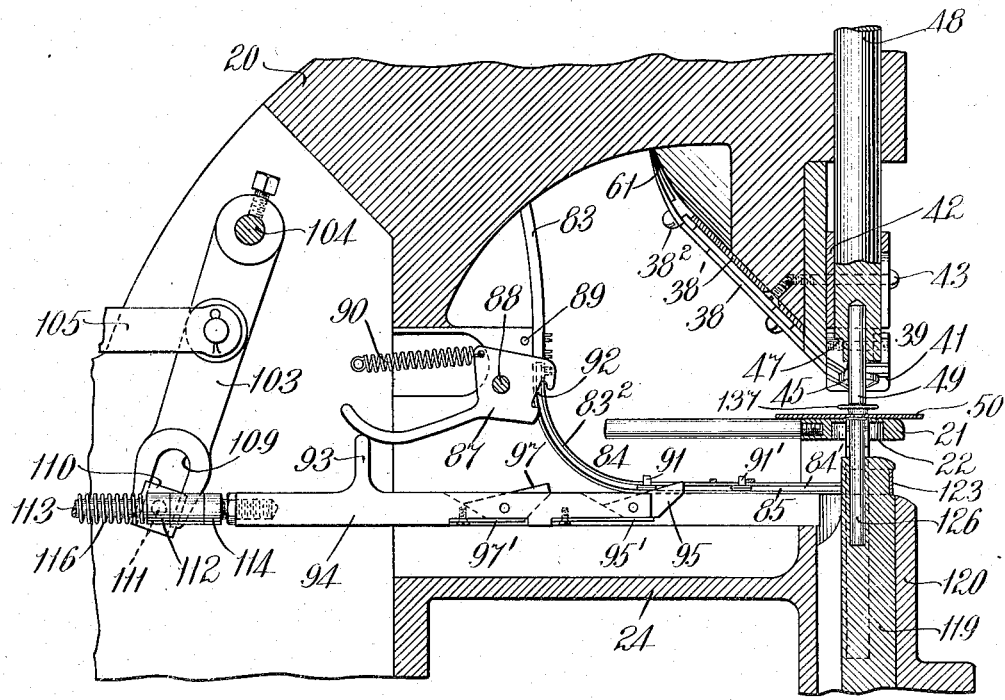
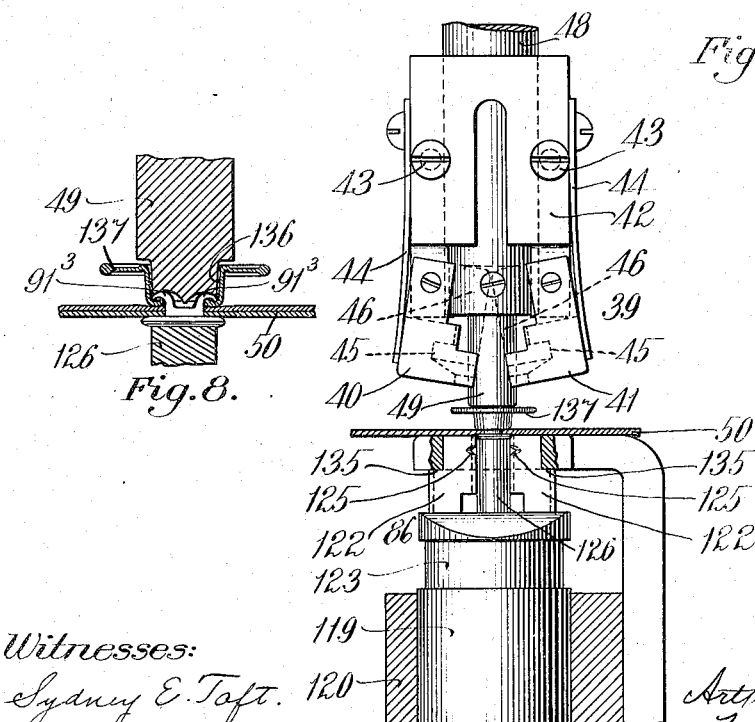

A. R. HAVENER.
MACHINE FOR ATTACHING BUTTONS, &c., TO FABRIC.
APPLICATION FILED NOV. 7, 1908.

937,150.

Patented Oct. 19, 1909.
8 SHEETS—SHEET 7.

Witnesses:
Sydney E. Taft.
Franklin E. Low.

Inventor:
Arthur R. Havener,
by his attorney,
Charles T. Gooding.

A. R. HAVENER.
MACHINE FOR ATTACHING BUTTONS, &c., TO FABRIC.
APPLICATION FILED NOV. 7, 1908.
937,150.
Patented Oct. 19, 1909.
8 SHEETS—SHEET 8.
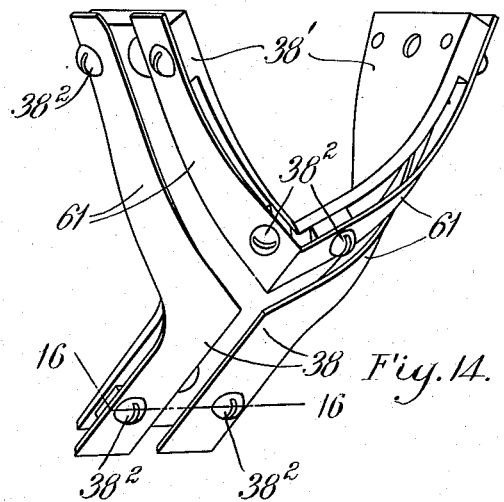
Fig. 14.
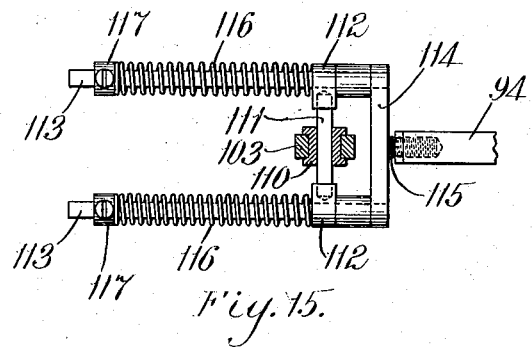
Fig. 15.
Fig. 13.
Fig. 16.
Witnesses.
Sydney E. Taft.
Franklin E. Low.
Inventor:
Arthur R. Havener
by his attorney

UNITED STATES PATENT OFFICE.

ARTHUR R. HAVENER, OF WALTHAM, MASSACHUSETTS, ASSIGNOR TO WILLIAM P. BARTEL, OF WALTHAM, MASSACHUSETTS.

MACHINE FOR ATTACHING BUTTONS, &c., TO FABRIC.

937,150.

Specification of Letters Patent.  Patented Oct. 19, 1909.

Application filed November 7, 1908. Serial No. 461,471.

*To all whom it may concern:*

Be it known that I, ARTHUR R. HAVENER, a citizen of the United States, residing at Waltham, in the county of Middlesex and State of Massachusetts, have invented new and useful Improvements in Machines for Attaching Buttons or the Like to Fabric, of which the following is a specification.

This invention relates to a machine for attaching buttons to garments, such as the suspender and fly buttons of trousers and the like.

The machine of this invention is particularly adapted to attach two-part buttons to fabric or garments, one of the parts consisting of a head with a depression therein and the other consisting of a foot with a shank integral therewith and preferably split or bifurcated to form prongs.

The machine embodies in its construction two hoppers for separating and feeding button heads of two different sizes, and from these hoppers the button heads are fed by means of two raceways to a main raceway, which main raceway leads to a button head holder. The button feet are held in another holder located beneath the fabric and are fed to said holder from a raceway, which raceway is supplied with button feet fed thereto from a suitable hopper. The button head is carried downwardly to the fabric, which is supported upon a suitable work-support, from its holder, by a plunger and anvil, which anvil fits the depression in the top of the button head. The button foot is carried upwardly out of its holder by a driver and driven through the fabric and through a hole in the bottom of the button head and the prongs upon the shank of the button foot then engage the anvil which is located in the depression in the top of the button head. These prongs are thus turned outwardly away from each other and are clenched by the anvil within the depression in said button head, thus firmly uniting the head and foot of the button and simultaneously attaching said button to the fabric. After the head and foot have thus been united and attached to the fabric, the anvil and driver move away from each other and from the fabric in opposite directions, thus leaving the fabric free to be fed forward to have another button attached thereto.

The invention relates particularly to the button head holding means, to the button foot holding means and the mechanism which feeds the button foot to its holder or carrier and particularly the invention relates to the mechanism by means of which the shank of the button is driven through the fabric and against an anvil located within the depression in the button head, so that the legs of the button foot shank are spread by engaging the anvil located within the depression in the button head.

The invention consists in the combination and arrangement of parts set forth in the following specification and particularly pointed out in the claims thereof.

Figure 2:
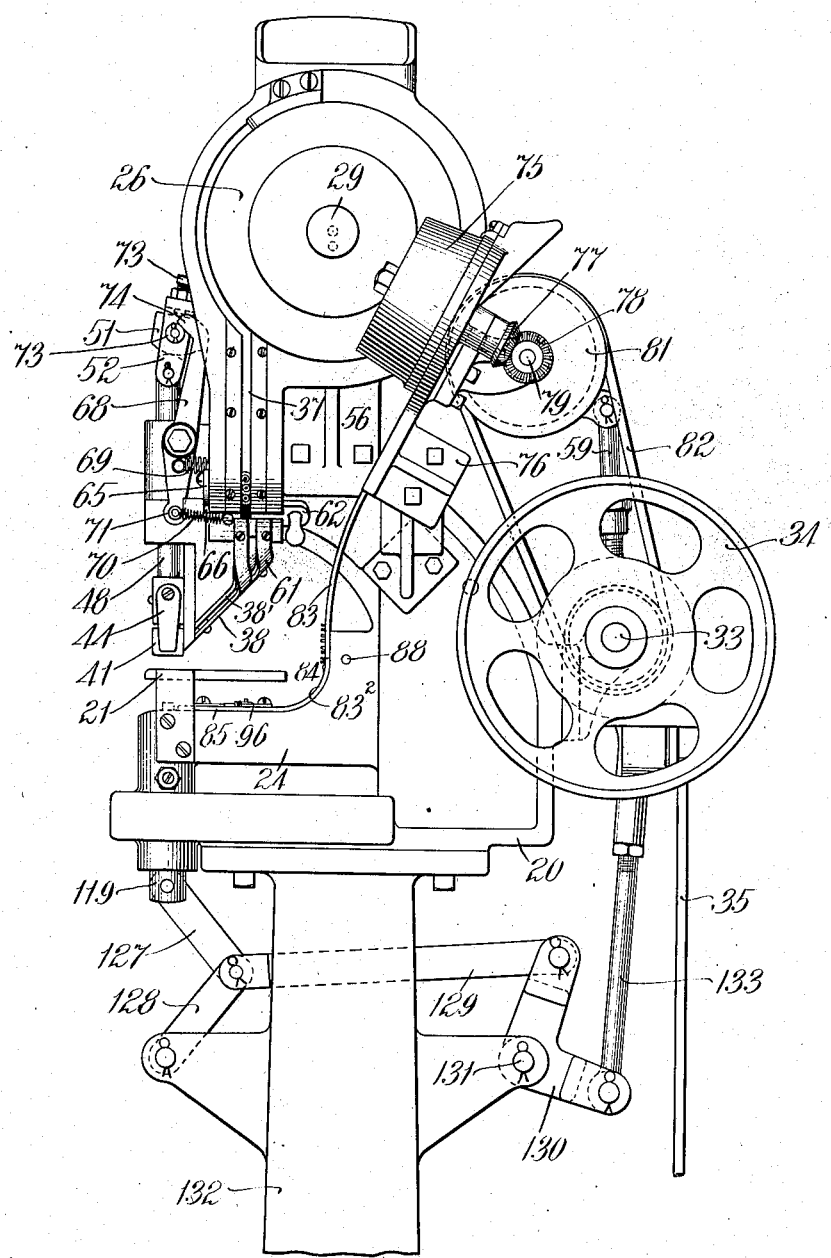
Figure 3:
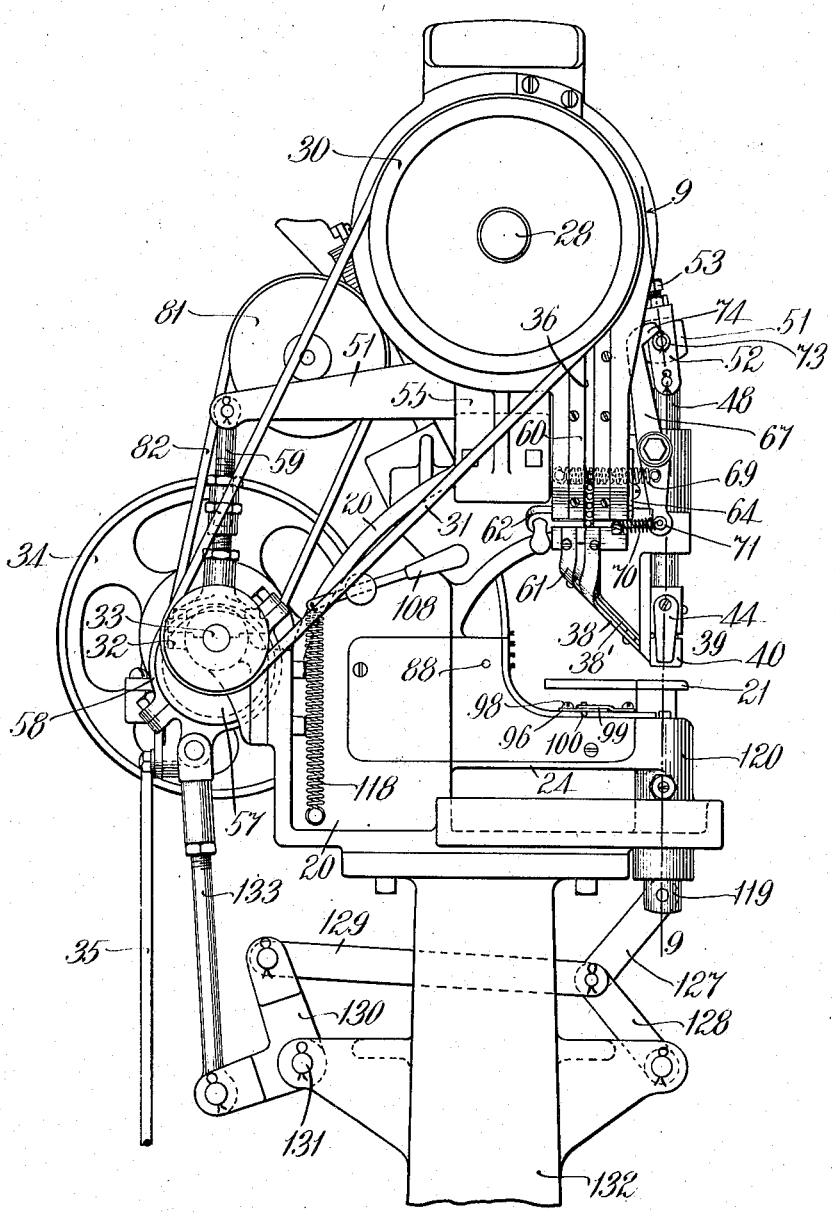
Figure 4:
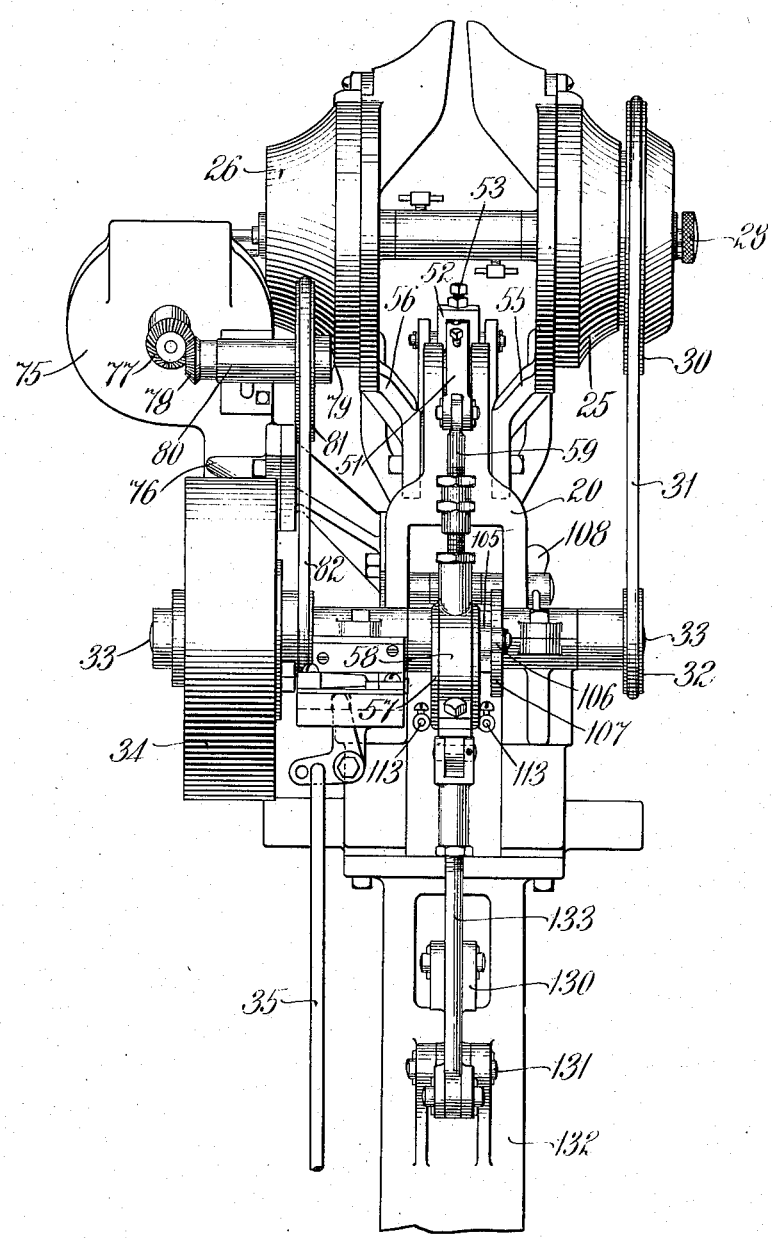
Figure 9:
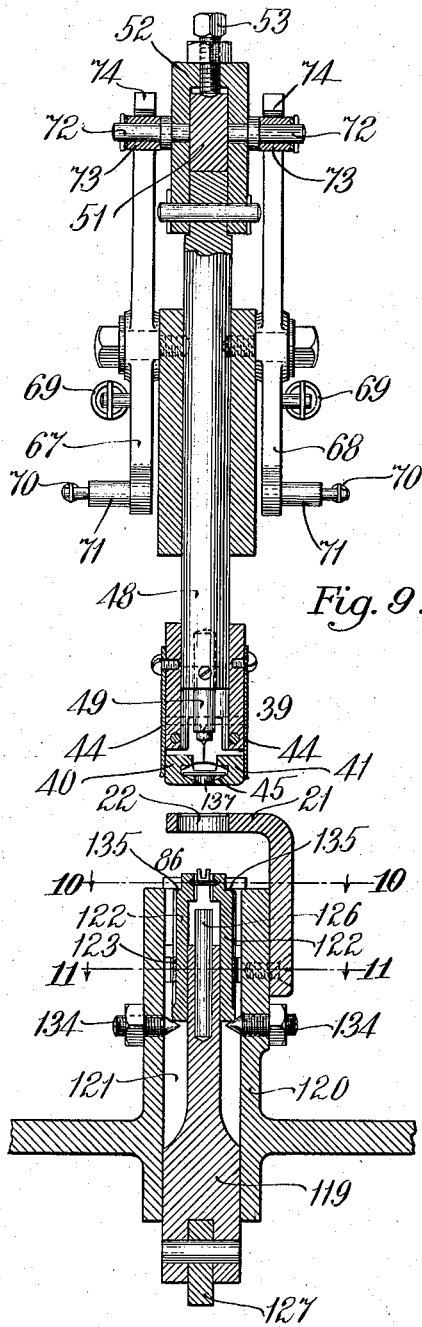
Figure 10:
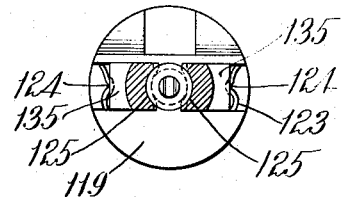
Figure 11:
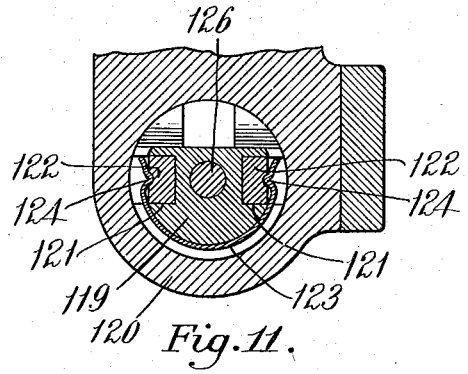
Figure 12:
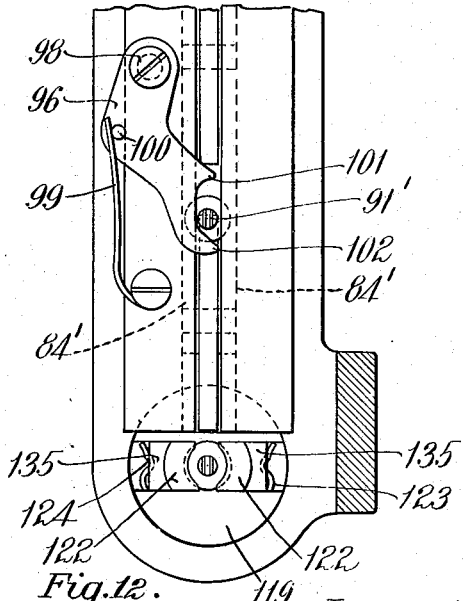

Referring to the drawings: Figure 1 is a front elevation of my improved machine for attaching buttons to garments, the standard of the machine being broken away to save space in the drawings. Fig. 2 is a right hand side elevation of the same. Fig. 3 is a left hand side elevation of the same. Fig. 4 is a rear elevation of the same. Fig. 5 is a longitudinal section, partly in elevation, taken on line 5—5 of Fig. 1, showing the button setting instrumentalities separated. Fig. 6 is a section similar to Fig. 5, broken away and showing the button setting instrumentalities in the position occupied thereby when the button head and foot are attached to each other and to the fabric. Fig. 7 is a front elevation of the button setting instrumentalities, showing the fabric and a portion of the frame in section. Fig. 8 is a sectional elevation showing the button head and foot attached to each other and to a piece of fabric, the anvil for the button head and the driver for the button foot being shown in section in connection therewith. Fig. 9 is a sectional elevation taken on line 9—9 of Fig. 3. Fig. 10 is a detail section taken on line 10—10 of Fig. 9. Fig. 11 is a detail section taken on line 11—11 of Fig. 9. Fig. 12 is a plan view partly in section of the horizontal portion of the button foot raceway, the same being broken away to save space. Fig. 13 is a perspective view of the botton feed slide. Fig. 14 is a perspective view of the main button head raceway and the lower sections of the two auxiliary raceways, showing the same attached to the supporting Y-shaped bracket. Fig. 15 is a detail plan of the yoke which is attached to the button foot feed slide. Fig. 16 is a detail section taken on line 16—16 of Fig. 14.

Like numerals refer to like parts throughout the several views of the drawings.

In the drawings, 20 is the frame of the machine.

21 is the holder for the work or fabric, consisting of a right angle bracket with a hole 22 extending through the horizontal portion thereof, said bracket being fastened to a standard 120 projecting upwardly from the arm 24 which is a part of the frame 20.

The button heads, which are of two sizes, are separated from each other by hoppers 25 and 26, and these hoppers are rotated by means of a shaft 27 from which they may be connected or disconnected by means of clutch pins 28 and 29, respectively. The shaft 27 is driven by means of a pulley 30 which, in turn, is driven by a belt 31 and pulley 32, the pulley 32 being fastened to the main driving shaft 33 which is rotated by a suitable clutch pulley 34, operated to connect the same to or disconnect the same from the main driving shaft 33 by a treadle-rod 35 which is connected to a treadle (not shown in the drawings.) The button heads pass from the hoppers 25 and 26, respectively, down the auxiliary raceways 36 and 37, respectively, which at their lower ends converge and open into the main raceway 38 down which they pass and are guided thereby to the button head holder 39.

The button head holder 39 (see Figs. 6 and 7) consists of two fingers 40 and 41 which are pivoted to a block 42 which is fastened to the frame 20 by screws 43, 43. The button head fingers 40 and 41 are pressed toward each other by springs 44, 44 and are provided with recesses 45, 45 in their lower ends adapted to receive the head of a button. Said button fingers are also provided with arms or extensions 46, 46 upon their rear sides, which are engaged, in the operation of the machine, by a shoulder 47 upon a plunger 48 when said plunger descends to the position illustrated in Figs. 6 and 7, thus opening the button fingers, as seen in Fig. 7, and releasing the button head so that the same may be carried downwardly by the anvil 49 into contact with the fabric 50, as shown in said Figs. 6 and 7.

The anvil 49 is fastened to the plunger 48, said plunger being adapted to slide in ways provided in the frame 20 and in the block 42. A vertical reciprocatory motion is imparted to the plunger 48 and to the anvil 49 which is fastened thereto by a lever 51, the front end of which is rounded upon its lower edge to form a rocking contact with the rounded upper end of the plunger 48. The front end of said lever 51 projects between the two side arms of the yoke 52, and said yoke is provided with a screw 53 which bears against the upper edge of the lever 51, so that in a rocking movement of the lever, the lower edge thereof rocks against the upper end of the plunger 48 and the upper edge thereof rocks upon the screw 53. The lever 51 is fast to a rock-shaft 54 journaled to rock in bearings in the frame. A rocking movement is imparted to the lever 51 by an eccentric 57 fast to the main driving shaft 33 and having an eccentric strap 58 surrounding the same which is connected to the lever 51 by the eccentric rod 59.

The button heads may be fed either from the hopper 25 or from the hopper 26, according to which size button head it is desired to attach to the garment. The button hopper 25 is connected to the shaft 27, as hereinbefore set forth, by the clutch pin 28 and the hopper 26 is connected to said shaft by the clutch pin 29. As seen in Fig. 1 the hopper 25 is connected to the shaft and the hopper 26 is disconnected therefrom, the pin 28 being shown in its innermost position and the pin 29 being shown thrown outwardly.

The auxiliary raceways 36 and 37 are substantially the same in construction and, therefore, a description of the auxiliary raceway 36 and the manner in which the button heads are fed down said raceway will apply equally well to the auxiliary raceway 37. Said auxiliary raceway, then, consists of an upper section 60 and a lower section 61 (see Fig. 3), said sections being out of alinement with each other. A feed slide or separator 62, adapted to slide in suitable ways provided therefor, extends transversely of the sections 60 and 61 and is provided with a slot 63 which receives a button head from the upper section and when said separator is moved toward the left (Fig. 3), the button head is fed by the separator or feed slide into alinement with the lower section and the button head then drops out of the feed slide into the lower section and slides into the main raceway 38, thence sliding down said main raceway and in between the button fingers 40 and 41, ready to be carried downwardly into contact with the anvil and with the fabric on the fabric support. The lower sections of the auxiliary raceways and the main raceway 38 are fastened to a Y-shaped bracket 38' by means of screws 38², 38² and this bracket is fastened to the frame of the machine so that the main raceway and the lower sections of the auxiliary raceways may be removed from the machine for adjustment, repair or cleaning by unscrewing the bracket 38'. The separator slides for the two auxiliary raceways are locked in a stationary position when it is desired to throw either one out of action, by the locking levers 64 and 65 (see Fig. 1) in which the locking lever 64 is thrown out of action and the lever 65 is thrown into action. These levers are adapted to engage a slot 66 in their respective separator slides when thrown into engagement therewith. In Fig. 1 it will be seen that the locking lever 64 is thrown out of engagement and the locking lever 65 is thrown into engagement with their respective separator slides, and, therefore, the button heads will be fed down the raceway 36 and will be prevented from feeding down the raceway 37.

The mechanism for operating the feed slides or separators for the auxiliary raceways is illustrated in Figs. 1, 2, 3 and 9. Referring now to these figures it will be seen that the frame 20 has pivoted thereto, at opposite sides of the bearing for the plunger 48, levers 67 and 68. These levers are connected by springs 69 to the frame of the machine and by springs 70 to their respective separator slides, the springs 70 being connected at one end to the respective separator slides and at the other ends to studs 71, 71 fast to the lower ends of said levers 67 and 68. The studs 71, 71 bear against the front ends of the separator slides, so that it will be seen that when the levers 67 and 68 are rocked upon their respective pivots, the separator slides will be moved by a spring connection between them and the levers 67 and 68 and also will be moved backwardly by a spring tension imparted to the levers 67 and 68 by springs 69, 69, so that if the button head becomes caught and the separator slide cannot move freely, said button head will not be damaged or jammed, as one of the springs 70 or 69 will yield, according to the direction in which the lever 67 or 68 is being moved. A rocking motion is imparted to the levers 67 and 68 by the studs 72, 72 fast to the yoke 52, said studs being provided with friction rolls 73, 73 which bear against the front edges of the levers 67 and 68, and at the end of the upward motion of the plunger 48 engage the forwardly extending projections 74, 74 upon said levers 67, 68. It will be understood that only one of the levers 67 or 68 is being operated at the same time, and that when the locking lever 64 is in the position illustrated in Fig. 1, then the lever 67 will be operated by reason of the stud 72 and its roll 73 engaging the projection 74 at the upper end of said lever and rocking said lever upon its pivot at the end of the upward motion of the plunger 48. At this time, however, the locking lever 65 will be in the position illustrated in Fig. 1 and its separator slide 62 will be in its forward position, thus rocking the lever 68 into the position illustrated in Fig. 2, in which position it is out of action, the stud 72 and its roll 73 merely contacting with the projection 74 upon said lever at the extreme upper end of the movement of the plunger 48, said stud 72 and roll 73, however, not imparting any rocking movement to the lever 68 when the same is locked back in the position illustrated in Fig. 2. When it is desired to feed button heads from the hopper 26 and down the auxiliary raceway 37 to the main raceway 38, the locking lever 64 is thrown into position to lock its separator slide 62 and the locking lever 65 is thrown out of action to allow this separator slide to be operated, as hereinbefore described, to feed the button heads from the upper section of the raceway 37 to the lower section thereof.

I will now proceed to describe the mechanism which feeds the button feet and their shanks to the button foot holder or carrier and also the mechanism which removes the button foot from the button foot carrier and drives the same into the button head and against the anvil.

The button feet are contained in quantity in a hopper 75 (Figs. 2 and 4), said hopper being rotatably mounted upon a bracket 76 fast to the frame of the machine. A rotary motion is imparted to said button foot hopper by bevel gears 77 and 78, the bevel gear 78 being fastened to a shaft 79 journaled in a bracket 80 and rotated by a pulley 81. The pulley 81 is rotated by a belt 82 upon the main driving shaft 33. The button feet pass from the hopper 75 down the downwardly extended portion 83 of a raceway 84, the portion 85 of said raceway being horizontal and leading to the button foot carrier 86, Fig. 6. The button feet are fed from the upper portion 83 of the raceway to the horizontal lower portion 85 one by one by means of a feed-finger 87 (Figs. 5 and 6) which is pivoted at 88 to the frame of the machine. Said feed-finger is held in the position illustrated in Fig. 5 against a pin 89 by a spiral spring 90, and when in this position allows a button foot 91 (Fig. 5) to slide down the inclined portion 83 (Fig. 1) into the vertically curved portion $83^2$ by reason of the feed finger 87 having a recess 92 therein, into which the button foot passes, as shown in Fig. 5. The feed-finger 87 is then rocked by a projection 93 upon the slide 94, which, as it moves rearward or toward the left, from the position shown in Fig. 5 to that shown in Fig. 6, tips the feed-finger from the position shown in Fig. 5 to that shown in Fig. 6 and thus dumps the button foot 91 down the vertically curved portion $83^2$ of the raceway 84, and said button foot 91 then slides down to the position shown in Fig. 6. Another button foot 91', which has been previously fed, is located upon the horizontal portion 85 of the raceway 84 and when the slide 94 is moved toward the right, from the position illustrated in Fig. 6 to that illustrated in Fig. 5, the button foot 91' will be carried by a dog 95 out of engagement with the detent 96 (Fig. 12) and onto the button foot carrier 86, while the button foot 91 will be carried by a dog 97, pivoted to the slide 94, from the position illustrated in Fig. 6 into engagement with the spring-pressed detent 96, as shown in Fig. 12. The dogs 95 and 97 are held in the position illustrated in Figs. 5 and 6 by flat springs 95' and 97'. The detent 96 is pivoted at 98 to the horizontal portion 85 of the raceway 84 and is held in the position illustrated in Fig. 12 by a spring 99 which bears against a stop-pin 100 fast to the spring detent 96 and projecting downwardly therefrom to abut against the side of the horizontal portion of the raceway 84, which thus forms a stop to limit the distance to which the detent can be moved toward the right (Fig. 12) by the spring 99. Said detent has two prongs 101 and 102 thereon which are inclined upon their rear edges in order to facilitate the rocking of the detent 96 upon its pivot toward the left (Fig. 12) when the button foot is being fed out of engagement therewith, or when the button foot is being fed into engagement therewith. For instance, when a button foot is being fed out of engagement therewith, the forward dog 95 engages the button foot beneath the raceway and pushes the same forward, the shank of said button foot engaging the inclined rearward edge of the projection 102 and thus swinging said detent toward the left (Fig. 12). When the button foot which is being carried forward to engagement with the detent 96 by the dog 97 engages the rearward edge of the projection 101, then the detent 96 is again swung toward the left until the shank of the button foot passes into the space between the projections 101 and 102, when said detent snaps back into place and the button foot is left in the position illustrated in Fig. 12.

A reciprocatory movement is imparted to the slide 94 by a lever 103 (Fig. 5) which is fast to a rock-shaft 104 journaled to rock in the frame of the machine and has a rocking movement imparted thereto by a cam slide 105 upon which is journaled a cam-roll 106 which bears against a cam 107 fast to the main driving shaft 33. The shaft 104 has a hand lever 108 fast thereto (see Figs. 3 and 5) whereby said lever may be rocked by hand, if desired. The lower end of the lever 103 is slotted at 109 to receive a sliding block 110 which is pivoted upon a pin 111 fastened at its opposite ends to collars 112, 112 (Fig. 15). These collars are adapted to slide upon rods 113, 113 fast to a yoke 114, which yoke is adjustably fastened to the slide 94 by the screw-threaded rod 115. Spiral springs 116 encircle the rods 113, 113 and bear at one end against the collars 112, and at the other end against collars 117 which are fastened to the rods 113, 113. The roll 106 is kept in engagement with the periphery of the cam 107 by a spiral spring 118 fast to the hand lever 108 at one end and to the frame at the other end thereof. It will be seen that when the slide 94 is moving toward the right, it is carried forward by the pressure of the spring 118, so that if a button foot should become "stuck" or jammed the slide 94 would stop and no harm would result. When the slide 94 is being moved in the opposite direction, if a button foot should become jammed, then the springs 116, 116 would yield and there would be no damage resulting therefrom. The dogs 95 and 97 will also tip upon their pivots and yield, by reason of the springs 95' and 97' yielding, when the slide 94 moves toward the left and the outer ends of said dogs engage the button foot 91' when the same is held by the detent 96 and the button foot 91 upon the horizontal portion of the raceway 84.

The button foot, as hereinbefore set forth, is fed by the button slide 94 and by the dog 95 onto the button foot carrier 86. This carrier consists of a slide 119, which, in the present embodiment of my invention, I prefer to make cylindrical, said slide being adapted to move longitudinally thereof in a standard 120. The slide 119 is provided with grooves or ways 121, 121 and in each of these grooves is located a button foot holding finger 122, 122. These fingers are held in the grooves 121, 121 by a semicircular spring 123 which extends half way around the slide 119 and is provided with projections 124, 124 which project into corresponding recesses in the fingers 122, 122 (see Fig. 11). The rim of the button foot, when it is pushed in between the fingers 122, 122, as hereinbefore described, enters suitably formed recesses or grooves 125, 125 in the upper ends of said fingers. The plunger slide 119 has a driver 126 fast to the upper end thereof and adapted to engage the under side of the button foot and drive the same out from between the fingers 122, 122 through the fabric and through a hole in the bottom of the button head and clench the legs of the shank against the anvil located within the depression in said button head. A reciprocatory motion is imparted to the plunger slide 119 by toggle links 127, 128 which are connected by a link 129 to a lever 130, pivoted at 131 to the column 132, said lever being connected by a link 133 to the eccentric strap 58. The button fingers 122, 122 are adapted to slide, as hereinbefore set forth, in the grooves 121, 121 and said fingers are moved in said grooves by coming into engagement at their opposite ends, respectively, with suitable stops. For instance, when the plunger slide 119 is lowered, as shown in Fig. 9, the lower ends of the button fingers 122, 122 come into contact with the adjustable stop-screws 134, 134, and these stop-screws having conical inner ends may be adjusted to vary the point at which the fingers 122, 122 shall stop in their downward descent by adjusting said screws inwardly or outwardly as may be desired, thus bringing the grooves 125, which are to receive the button foot, into exact alinement with the corresponding grooves 84' which receive the button head upon the horizontal portion of the raceway 84.

The button fingers 122, 122 are provided at their upper ends with shoulders 135 and when the plunger slide 119 is raised the button fingers move with it being held in the grooves by frictional engagement therewith and by the pressure of the semi-circular spring 123 until the shoulders 135, 135 come into engagement with the under side of the horizontal portion of the fabric support 21, whereupon the fingers 122, 122 become stationary, and the slide 119, continuing its upward movement, the driver 126 moves upwardly and engaging the under side of the button head drives the same out from between the fingers 122, 122 and drives the shank through the fabric and through the hole in the bottom of the button head and clenches the legs of said shank against the anvil located within the depression in said button head, said legs being spread apart by the anvil 49 and clenched within the depression in the button head, as shown in Fig. 8, thus firmly securing the button head and the button foot to the fabric and to each other.

Having thus specifically and to some extent, in general, described the operation of my improved machine for attaching buttons to fabric, I will now proceed to describe the general operation thereof. The fabric 50, or garment is placed upon the horizontal portion of the fabric support or work holder 21, in the proper position to have a button attached thereto. The operator then places his foot upon the treadle and operates the clutch which causes the clutch pulley 34 to become locked to the main driving shaft 33 which rotates said shaft, thus rotating the button head hopper or hoppers, as may be desired, and also rotating the button foot hopper. At the same time the eccentric 57, through the eccentric strap 58, eccentric rod 59 and lever 51, moves the plunger 48 downwardly, together with the anvil 49, and as said anvil descends the lower portion thereof enters the depression 136 in the button head 137 (Fig. 8) and upon a continued downward motion of the plunger 48 and anvil 49 the button head is carried downwardly from between the fingers 40, 41 which are opened to allow the button head to pass out of the recess 45 in said button fingers by the shoulder 47 upon the plunger 48, and when the plunger 48 has arrived at its lowermost position the under side of the button head will be pressed against the upper side of the fabric, as illustrated in Fig. 6. While the button head has thus been carried downwardly to contact with the fabric 50, the button foot has been carried upwardly by the button fingers and by the anvil in the following manner: The plunger slide 119 is moved upwardly by the links 127, 128, link 129, lever 130, link 133, eccentric strap 58 and eccentric 57, carrying the button fingers 122, 122, with the button foot therebetween, upwardly with them until the shoulders 135, 135 abut against the under side of the horizontal portion of the fabric support 21. Said button fingers then will remain stationary while the driver 126 passes upwardly between their upper ends and, engaging the button foot upon its under side, forces the same out from between said fingers and drives the shank through the fabric and into the hole in the bottom of the button head, the legs $91^a$, $91^a$ being spread apart by the anvil 49 and clenched within the depression in the button head, as shown in Fig. 8, thus firmly securing the button head and foot to the fabric and to each other. Upon the reverse movement the plunger slide 119 descends and the fingers 122, 122 are brought into proper location for the next button foot to be fed into the grooves 125, 125 therein by their lower ends abutting against the stop-screws 134, 134, as shown in Fig. 9. The plunger 48 and anvil 49 move upwardly away from the fabric and assume the position illustrated in Fig. 9 and the fabric is then free to be moved into a new position to have another button attached thereto, as hereinbefore described.

By reference to Figs. 5 and 6 it will be seen that the button foot is fed down the raceway 84 and is carried onto the button foot carrier 86 between the fingers 122, 122 in the following manner: Assuming the parts to be in the position illustrated in Fig. 6 and a button foot to have been located in engagement with the detent 96, as illustrated in Fig. 12 and also in Fig. 6, and another button foot 91 to be located, as shown, upon the horizontal portion of the raceway (Fig. 6); the slide 94 is carried forward by the rocking of the lever 103, as hereinbefore described, and the dog 95 engages the button foot 91' while the dog 97 engages the button foot 91. As the slide continues its forward movement the button foot 91' is pushed in between the fingers 122, 122 while the button foot 91 is carried from the position shown in Fig. 6 to that shown in Fig. 5. During the backward motion of the slide 94 the feed finger 87 is rocked by the projection 93 on said slide from the position illustrated in Fig. 5 to that illustrated in Fig. 6 and the button foot 91 is dumped from the feed finger downwardly in the raceway and sliding down said raceway assumes the position illustrated in Fig. 6 at the rear of the dog 95; also in the rearward movement of the slide 94 the dog 95 tips upon its pivot when it engages the button foot 91' in engagment with the detent 96, and the dog 97 is adapted to tip upon its pivot when it engages the button foot 91.

These different motions are repeated, and during the different motions hereinbefore described the button heads are fed down the auxiliary and main raceways.

Having thus described my invention, what I claim and desire by Letters Patent to secure is:

1. A machine for attaching a button head to fabric by means of a button foot with a bifurcated shank, said machine having, in combination, a button head holder adapted to engage the periphery of said button head and stationary as to vertical movement; an anvil adapted to enter a depression in said button head, a button foot carrier adapted to engage the periphery of said button foot, a driver adapted to engage a button foot held on said carrier, and mechanism adapted to move said anvil and driver toward each other, whereby said button head may be removed from said holder and brought into contact with one face of said fabric, and said button foot, with its shank, removed from its carrier and said shank driven through said fabric and through a hole in said button head and clenched within said depression.

2. A machine for attaching a button head to fabric by means of a button foot with a bifurcated shank, said machine having, in combination, a stationary work-support, a button head holder adapted to engage the periphery of said button head and stationary as to vertical movement, an anvil adapted to enter a depression in said button head, a button foot carrier adapted to engage the periphery of said button foot, a driver adapted to engage a button foot held on said carrier, and mechanism adapted to move said anvil and driver toward each other, whereby said button head may be removed from said holder and brought into contact with one face of said fabric, and said button foot, with its shank, removed from its carrier and said shank driven through said fabric and through a hole in said button head and clenched within said depression.

3. In a machine for attaching buttons to fabric, a carrier for a button foot consisting of a slide, two fingers adapted to hold the button foot and shank therebetween, said fingers mounted upon said slide and adapted to slide in ways provided in said slide, resilient means for holding said fingers in said ways and for pressing them toward each other, and means adapted to be engaged by said fingers at opposite ends of the movement of said slide, whereby said fingers may be moved longitudinally of said slide and alternately in opposite directions thereon.

4. In a machine for attaching buttons to fabric, a carrier for a button foot consisting of a slide, two fingers adapted to hold a button foot and shank therebetween and adapted to slide in ways provided in said slide, resilient means for holding said fingers in said ways and for pressing them toward each other, and stationary stops adapted to be engaged by said fingers at opposite ends of the movement of said slide, whereby said fingers may be moved longitudinally of said slide.

5. In a machine for attaching buttons to fabric, a carrier for a button foot consisting of a slide, two fingers adapted to hold a button foot and shank therebetween said fingers mounted upon said slide and adapted to slide in ways provided in said slide, resilient means for holding said fingers in said ways and for pressing them toward each other, and a fabric support, constituting a stationary stop, adapted to be engaged by said fingers at one end of the movement of said slide, whereby said fingers may be moved longitudinally of said slide in one direction.

6. In a machine for attaching buttons to fabric, a carrier for a button foot consisting of a slide, two fingers adapted to hold a button foot and shank therebetween and adapted to slide in ways provided in said slide, resilient means for holding said fingers in said ways and for pressing them toward each other, and adjustable stop-screws adapted to be engaged by said fingers at one end of the movement of said slide, whereby said fingers may be moved longitudinally of said slide in one direction.

7. In a machine for attaching buttons to fabric, a carrier for a button foot consisting of a slide, two fingers adapted to hold a button foot and shank therebetween and adapted to slide in ways provided in said slide, resilient means for holding said fingers in said ways and for pressing them toward each other, and a driver fast to said slide adapted to engage said button foot and remove the same from between said fingers.

8. In a machine for attaching buttons to fabric, a carrier for a button foot consisting of a slide, two fingers adapted to hold a button foot and shank therebetween and adapted to slide in ways provided in said slide, resilient means for holding said fingers in said ways and for pressing them toward each other, a fabric support, constituting a stationary stop, adapted to be engaged by said fingers at one end of the movement of said slide, and a driver fast to said slide adapted to engage said button foot, remove the same from between said fingers, and drive the shank on said button foot through a piece of fabric on said fabric support.

9. In a machine for attaching buttons to fabric, a carrier for a button foot consisting of a slide, two fingers adapted to hold a button foot and shank therebetween and adapted to slide in ways provided in said slide, resilient means for holding said fingers in said ways and for pressing them toward each other, means adapted to be engaged by said fingers, whereby said fingers may be moved longitudinally of said ways, and a driver fast to said slide; in combination with an anvil adapted to enter a depression in a button head, and mechanism to move said driver and anvil toward each other, whereby the shank on said button foot may be driven through said fabric and through a hole in said button head and clenched against said anvil within said depression.

10. In a machine for attaching buttons to fabric, a carrier for a button foot consisting of a slide, two fingers adapted to hold a button foot and shank therebetween and adapted to slide in ways provided in said slide, resilient means for holding said fingers in said ways and for pressing them toward each other, stationary stops adapted to be engaged by said fingers at opposite ends of the movement of said slide, whereby said fingers may be moved longitudinally of said slide, and a driver fast to said slide; in combination with an anvil adapted to enter a depression in a button head and mechanism to move said driver and anvil toward each other, whereby the shank on said button foot may be driven through said fabric and through a hole in said button head and clenched against said anvil within said depression.

11. In a machine for attaching buttons to fabric, a carrier for a button foot consisting of a slide, two fingers adapted to hold a button foot and shank therebetween and adapted to slide in ways provided in said slide, resilient means for holding said fingers in said ways and for pressing them toward each other, a fabric support, constituting a stationary stop, adapted to be engaged by said fingers at one end of the movement of said slide, whereby said fingers may be moved longitudinally of said slide in one direction, and a driver fast to said slide; in combination with an anvil adapted to enter a depression in a button head, and mechanism to move said driver and anvil toward each other, whereby the shank on said button foot may be driven through said fabric and through a hole in said button head and clenched against said anvil within said depression.

12. In a machine for attaching buttons to fabric, a carrier for a button foot consisting of a slide, two fingers adapted to hold a button foot and shank therebetween and adapted to slide in ways provided in said slide, resilient means for holding said fingers in said ways and for pressing them toward each other, adjustable stop-screws adapted to be engaged by said fingers at one end of the movement of said slide, whereby said fingers may be moved longitudinally of said slide in one direction, and a driver fast to said slide; in combination with an anvil adapted to enter a depression in a button head and mechanism to move said driver and anvil toward each other, whereby the shank on said button foot may be driven through said fabric and through a hole in said button head and clenched against said anvil within said depression.

13. In a machine for attaching buttons to fabric, a carrier for a button foot consisting of a slide, two fingers adapted to hold a button foot and shank therebetween and adapted to slide in ways provided in said slide, resilient means for holding said fingers in said ways and for pressing them toward each other, and a driver fast to said slide adapted to engage said button foot and remove the same from between said fingers; in combination with an anvil adapted to enter a depression in a button head and mechanism to move said driver and anvil toward each other, whereby the shank on said button foot may be driven through said fabric and through a hole in said button head and clenched against said anvil within said depression.

14. In a machine for attaching buttons to fabric, a carrier for a button foot and shank, consisting of a slide having grooves in the opposite sides thereof, a vertical standard in which said slide is adapted to be reciprocated, two fingers adapted to hold said button foot and shank therebetween, said fingers arranged to slide in said grooves, resilient means for holding said fingers in said grooves and for pressing them toward each other, and two horizontal screws with conical ends having screw-threaded engagement with said standard and projecting into said grooves beneath said fingers, whereby said fingers may be moved longitudinally of said slide in one direction.

15. In a machine for attaching buttons to fabric, a plunger, an anvil fast thereto, and means to impart a reciprocatory motion to said plunger, a button head holder consisting of two fingers pivoted to a stationary support, spring-pressed toward each other and adapted to hold a button head therebetween, and arms on said fingers extending toward each other and adapted to be engaged by said plunger to release said button head from said fingers.

16. In a machine for attaching buttons to fabric, a button head holder consisting of two fingers pivoted to a stationary support, spring-pressed toward each other and adapted to hold a button head therebetween, arms on said fingers extending toward each other, a plunger, an anvil fast thereto and adapted to fit in a depression in said button head, and means to impart a reciprocatory motion to said plunger and anvil, said plunger adapted to engage said arms and move said fingers to release said button head whereby said button head may be carried by said anvil into contact with a piece of fabric thereneath.

17. A machine for attaching buttons or the like to fabric having, in combination, a holder for a button head, a main raceway leading to said holder, two auxiliary raceways leading into said main raceway, a set of instrumentalities for each of said auxiliary raceways, respectively, adapted to feed button heads one by one down said auxiliary raceways to said main raceway, and means to lock one of said sets of instrumentalities out of action while the other set is in operation.

18. A machine for attaching buttons or the like to fabric having, in combination, a holder for a button head, a main raceway leading to said holder, two auxiliary raceways leading into said main raceway, a set of instrumentalities for each of said auxiliary raceways, respectively, adapted to feed button heads one by one down said auxiliary raceway to said main raceway, means to lock one of said sets of instrumentalities out of action while the other set is in operation, a plunger, an anvil fast to said plunger adapted to engage a button head held in said holder, means adapted to impart a reciprocatory motion to said plunger, and means connected to said plunger adapted to operate each of said sets of button head feeding instrumentalities, respectively.

19. A machine for attaching buttons or the like to fabric having, in combination, a holder for a button head, a main raceway leading to said holder, two auxiliary raceways leading into said main raceway, each of said auxiliary raceways consisting of two sections out of alinement with each other, a slide extending transversely of each of said sections, respectively, adapted to feed a button head from one section to the other, means to lock each of said slides, respectively, a plunger, an anvil fast to said plunger adapted to engage a button head held in said holder, means adapted to move said plunger, and instrumentalities operated by the movement of said plunger adapted to impart a reciprocatory motion to each of said slides, respectively.

20. A machine for attaching buttons or the like to fabric having, in combination, a holder for a button head, a main raceway leading to said holder, two auxiliary raceways leading into said main raceway, each of said auxiliary raceways consisting of two sections out of alinement with each other, a slide extending transversely of each of said sections, respectively, adapted to feed a button head from one section to the other, means to lock each of said slides, respectively, a plunger, an anvil fast to said plunger adapted to engage a button head held in said holder, means adapted to move said plunger, and a lever connected to each of said slides, respectively and adapted to be operated by the movement of said plunger whereby said slides may be moved out of alinement with one of said sections and into alinement with the other of said sections, respectively.

21. A machine for attaching buttons or the like to fabric having, in combination, a holder for a button head, a main raceway leading to said holder, two auxiliary raceways leading into said main raceway, each of said auxiliary raceways consisting of two sections out of alinement with each other, a slide extending transversely of each of said sections, respectively, adapted to feed a button head from one section to the other, means to lock each of said slides, respectively, a plunger, an anvil fast to said plunger adapted to engage a button head held in said holder, a lever, a yoke pivoted to said plunger and connecting said lever to said plunger, studs fast to said yoke, and a lever connected to each of said slides, respectively, and adapted to be engaged by said studs, whereby button heads on either of said auxiliary raceways may be fed one by one to said main raceway and thence to said button head holder and removed therefrom by said anvil.

22. A machine for attaching buttons or the like to fabric having, in combination, a raceway in two sections out of alinement with each other, a slide extending transversely of said sections adapted to feed a button head from one section to the other, means to lock said slide to a stationary part, a lever, a spring connecting said lever to said slide, another spring connected to said lever and to a stationary part, and means to rock said lever in the opposite direction to that in which it may be rocked by said last named spring, whereby said slide may be moved in opposite directions with a resilient pressure.

23. A machine for attaching buttons or the like to fabric having, in combination, a carrier for a button foot, a raceway having a downwardly extended portion and a horizontal portion leading therefrom to said carrier, a spring-pressed detent adjacent to said horizontal portion, a feed finger adjacent to said downwardly extended portion adapted to feed said button feet one by one down said downwardly extended portion, and a slide located beneath said raceway adapted to actuate said feed finger to feed a button foot to said detent during one forward motion and from said detent to said carrier during the second forward motion.

24. A machine for attaching buttons or the like to fabric having, in combination, a carrier for a button foot, a raceway leading to said carrier, a spring-pressed detent adapted to engage a button foot on said raceway, a slide, and means supported on said slide and adapted to engage a button foot on said raceway and feed the same into engagement with said detent during one forward movement of said slide, and other means on said slide adapted to engage said button foot and feed it from said detent to said carrier during the second forward movement of said slide.

25. A machine for attaching buttons or the like to fabric, having, in combination, a carrier for a button foot, a raceway leading to said carrier, a spring-pressed detent on said raceway, a slide, a dog pivoted to said slide adapted to engage a button foot on said raceway and feed the same into engagement with said detent during one forward movement of said slide, and a second dog pivoted to said slide and adapted to engage said button foot and feed it from said detent to said carrier during the second forward movement of said slide.

26. A machine for attaching buttons or the like to fabric having, in combination, a carrier for a button foot, a raceway having a horizontal portion leading to said carrier, a spring-pressed detent on said horizontal portion, a slide located beneath said horizontal portion, and means carried by said slide adapted to engage a button foot on said raceway and feed said button foot along said slide and into engagement with said detent.

27. A machine for attaching buttons or the like to fabric having, in combination, a carrier for a button foot, a raceway having a horizontal portion leading to said carrier, a spring-pressed detent on said horizontal portion, a slide located beneath said horizontal portion, and means carried by said slide adapted to engage a button foot on said raceway and feed the same out of engagement with said detent and onto said carrier.

28. A machine for attaching buttons or the like to fabric having, in combination, a carrier for a button foot, a raceway having a horizontal portion leading to said carrier, a spring-pressed detent on said horizontal portion, a slide located beneath said horizontal portion, and a dog pivoted to said slide adapted to engage a button foot on said raceway and feed said button foot along said slide and into engagement with said detent.

29. A machine for attaching buttons or the like, to fabric, having, in combination, a carrier for a button foot, a raceway having a horizontal portion leading to said carrier, a spring-pressed detent on said horizontal portion, a slide located beneath said horizontal portion, and a dog pivoted to said slide adapted to engage a button foot on said raceway and feed the same out of engagement with said detent and onto said carrier.

30. A machine for attaching buttons and the like to fabric having, in combination, a carrier for a button foot, a horizontal raceway leading to said carrier, a detent adjacent to said raceway adapted to engage a button foot thereon, a slide located beneath said raceway, and means carried by said slide adapted to engage a button foot on said raceway and feed the same out of engagement with said detent and onto said carrier, and mechanism adapted to move said slide in one direction and to yieldingly move said slide in the opposite direction.

31. A machine for attaching buttons and the like to fabric having, in combination, a carrier for a button foot, a horizontal raceway leading to said carrier, a detent adjacent to said raceway adapted to engage a button foot thereon, a slide located beneath said raceway, and means carried by said slide adapted to engage a button foot on said raceway and feed the same out of engagement with said detent and onto said carrier, power driven mechanism adapted to move said slide in one direction and to yieldingly move said slide in the opposite direction, and means to operate said slide by hand independent of said power driven mechanism.

32. A machine for attaching buttons and the like to fabric having, in combination, a carrier, a raceway having a downwardly extended portion and a horizontal portion leading therefrom to said carrier, a finger adjacent said downwardly extended portion of said raceway adapted to feed button feet one by one down said downwardly extended portion to said horizontal portion, a spring-pressed detent on said horizontal portion, a slide located beneath said horizontal portion, means on said slide adapted to operate said finger, another means on said slide adapted to feed a button foot along said horizontal portion of said raceway into engagement with said detent, other means on said slide adapted to feed said button foot from said detent onto said carrier, and mechanism adapted to move said slide toward said carrier and to yieldingly move said slide away from said carrier.

33. A machine for attaching buttons and the like to fabric having, in combination, a carrier, a raceway having a downwardly extended rear portion, a horizontal portion leading therefrom to said carrier, a finger adjacent said downwardly extended portion of said raceway adapted to feed button feet one by one down said downwardly extended portion to said horizontal portion, a spring pressed detent on said horizontal portion, a slide located beneath said horizontal portion, means on said slide adapted to operate said finger, another means on said slide adapted to feed a button foot along said horizontal portion of said raceway into engagement with said detent, other means on said slide adapted to feed said button foot from said detent onto said carrier, power driven mechanism adapted to yieldingly move said slide toward said carrier and to yieldingly move said slide away from said carrier, and means to operate said slide by hand independent of said power driven mechanism.

34. A machine for attaching buttons or the like to fabric, having, in combination a holder for a button head, a main raceway leading to said holder, two auxiliary raceways intersecting each other and leading into said main raceway, each of said auxiliary raceways consisting of two sections out of alinement with each other and a bracket to which said main raceway and the two lower sections of said auxiliary raceways are attached.

In testimony whereof I have hereunto set my hand in presence of two subscribing witnesses.

ARTHUR R. HAVENER.

Witnesses:
S. L. CROCKETT,
D. L. WHALEN.